(12) United States Patent
Ji et al.

(10) Patent No.: US 8,090,066 B2
(45) Date of Patent: Jan. 3, 2012

(54) METHOD AND CIRCUIT FOR OBTAINING ASYNCHRONOUS DEMAPPING CLOCK

(75) Inventors: Kuiwen Ji, Shenzhen (CN); Lei Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 918 days.

(21) Appl. No.: 11/702,889

(22) Filed: Feb. 6, 2007

(65) Prior Publication Data
US 2007/0183551 A1    Aug. 9, 2007

Related U.S. Application Data

(63) Continuation of application No. PCT/CN2006/000398, filed on Mar. 15, 2006.

(30) Foreign Application Priority Data

Apr. 15, 2005 (CN) .......................... 2005 1 0064588

(51) Int. Cl.
*H04L 7/00* (2006.01)
(52) U.S. Cl. ........ 375/372; 375/354; 375/370; 375/371; 375/373; 375/376; 370/516; 370/503; 370/535; 370/508; 370/509; 370/510; 370/512; 370/514
(58) Field of Classification Search .................. 375/354, 375/370, 371, 372, 373, 376
See application file for complete search history.

(56) References Cited

U.S. PATENT DOCUMENTS

| | | | | |
|---|---|---|---|---|
| 5,245,636 A * | 9/1993 | Sari et al. | ...................... | 375/372 |
| 5,268,936 A * | 12/1993 | Bernardy | ...................... | 375/372 |
| 5,367,545 A * | 11/1994 | Yamashita et al. | ............ | 375/372 |
| 5,390,180 A * | 2/1995 | Reilly | ............................ | 370/476 |
| 5,402,452 A * | 3/1995 | Powell et al. | ................... | 375/372 |
| 5,548,624 A * | 8/1996 | Yoshida | ........................ | 375/372 |
| 5,781,596 A * | 7/1998 | Shields | ......................... | 375/371 |
| 5,956,347 A * | 9/1999 | Slater | ............................. | 370/503 |
| 6,088,413 A * | 7/2000 | Autry et al. | ..................... | 375/372 |
| 6,208,216 B1* | 3/2001 | Nasila | ........................... | 332/110 |
| 6,252,850 B1* | 6/2001 | Lauret | ........................... | 370/235 |
| 6,463,111 B1 | 10/2002 | Upp | | |
| 6,501,809 B1* | 12/2002 | Monk et al. | .................... | 375/363 |

(Continued)

FOREIGN PATENT DOCUMENTS

CN         1511400 A        7/2004

(Continued)

OTHER PUBLICATIONS

Office Action in respect of counterpart application EP 06 722 051.7, Jun. 2008.

(Continued)

*Primary Examiner* — Siu Lee
(74) *Attorney, Agent, or Firm* — Conley Rose, P.C.; Grant Rodolph

(57) ABSTRACT

A method and a circuit for obtaining asynchronous demapping clock. The method includes: obtaining a smoothed clock with even gaps in accordance with data to be demapped and a corresponding clock signal; performing phase locking in accordance with a signal reflecting writing and reading conditions of data of a First In First Out (FIFO), to obtain a clock signal required for demapping. The method can effectively filter off jittering created during asynchronous mapping/demapping processes and may ensure a high-performance clock output. Furthermore, the method is applicable to not only mapping from OTN to SDH but also other asynchronous demapping processes, e.g., mapping from SDH to OTN, and thereby effectively improving the performance of data demapping.

4 Claims, 7 Drawing Sheets

U.S. PATENT DOCUMENTS

| | | | | |
|---|---|---|---|---|
| 6,836,854 B2* | 12/2004 | Ranganath et al. | ............ | 713/503 |
| 7,539,196 B2* | 5/2009 | Flavin et al. | .................. | 370/394 |
| 2002/0021719 A1* | 2/2002 | Acimovic | ..................... | 370/518 |
| 2003/0161350 A1* | 8/2003 | Wolf | ............................. | 370/516 |
| 2005/0074032 A1 | 4/2005 | Surek | | |

FOREIGN PATENT DOCUMENTS

| | | |
|---|---|---|
| EP | 1 343 261 | 9/2003 |
| WO | 99/27669 | 6/1999 |
| WO | 03079591 A1 | 9/2003 |

OTHER PUBLICATIONS

An International Search Report in respect of counterpart application PCT/CN2006/000398, Jun. 26, 2009.

Xu Dongming, "The Extraction of 2 MBIT/S Signal From STM-1 and Desynchronizing", Study on Optical Communications, Jun. 2000, pp. 46-48, 60.

Written Opinion of the International Searching Authority in respect of counterpart application PCT/CN2006/000398, Jun. 29, 2009.

Chinese First Office Action in respect of Chinese priority application 200510064588.8 with partial English translation, Jun. 29, 2009.

"Series G: Transmission Systems and Media, Digital Systems and Networks", ITU-T, G.707/Y.1322, *International Telecommunication Union*, Corrigendum 1, Jun. 2004, 22 pages.

"Series G: Transmission Systems and Media, Digital Systems and Networks", ITU-T, G.8251, Amendment 1, Jun. 2002, 60 pages.

"Series G: Transmission Systems and Media, Digital Systems and Networks", ITU-T, G.8251, Corrigendum 1, Jun. 2002, 12 pages.

"Series G: Transmission Systems and Media, Digital Systems and Networks", ITU-T, G.8251, Nov. 2001, 64 pages.

"Series G: Transmission Systems and Media, Digital Systems and Networks", ITU-T, G.707/Y.1322, Dec. 2003, 192 pages.

* cited by examiner

METHOD AND CIRCUIT FOR OBTAINING ASYNCHRONOUS DEMAPPING CLOCK

This application is a continuation copending International Application PCT/CN2006/000398 filed Mar. 15, 2006, which designated the U.S., claims the benefit thereof and incorporates the same by reference.

FIELD OF THE INVENTION

The present invention relates to the field of optical network, particularly to a method and a circuit for obtaining an asynchronous demapping clock.

BACKGROUND OF THE INVENTION

With the increasing utilization of synchronous digital hierarchy (SDH) networks, there is a demand for transmitting the OTN (Optical Transport Network) connection signal ODUk (Optical Channel Data Unit k) in SDH network. In addition, in consideration of the coexistence of OTN and SDH networks, it is also necessary to provide a method of mapping ODUk signal into C-4-Xv (C-4 plus the overhead constitutes the STM-N data) in the form of client data and to transmitting it in a virtual concatenation mode.

ITU-T G.707 standard defines a method of mapping an ODUk signal into a C-4-Xv signal asynchronously, so that the ODUk connection signal may be transmitted in SDH network in VC-4 virtual concatenation mode, that is, ODU1 is mapped into C-4-17C, while ODU2 is mapped into C-4-68v. FIG. 1 shows an actual mapping structure from ODU1 to C-4-17c, wherein D represents payload, R represents fixed padding data, and C represents adjustment opportunity in which CCCCC=00000 indicates that S is a payload, while CCCCC=11111 indicates that S is padding data.

Taking the ODU1 as an example, when ODU1 data are demapped and recovered, an asynchronous clock for ODUl has to be recovered from C-4-17c. The asynchronous mapping and demapping processes will inevitably result in a great deal of mapping and combination jittering. It is known from the definition in G.8251 that OTN services have strict requirements regarding jittering. As a result, a clock recovery scheme is required to filter off the jittering so as to ensure the clock performance.

An existing implementation to filter off jittering and ensure the performance of clock is shown in FIG. 2, in which a writing control module generates a gapped clock in accordance with the actual data and the corresponding clock signal, removes the overhead and padding bits from STM-N (Synchronous Transport Module Level N), and writes the actual ODU1 data into an FIFO (Fist In First Out) queue. In addition, the gapped clock is input into a phase lock loop (PLL) constituted by the serially connected phase discriminator (PD), low pass filter (LPF), and voltage controlled oscillator (VCO). The PLL performs a phase locking to the gapped clock to obtain the current ODU1 clock, i.e., the demapping clock signal.

The detailed procedure of the above described phase locking is: the PD produces a phase difference between the gapped clock and the ODU1 clock fed back by the VCO, in which the phase difference reflects the current difference between the data written into the FIFO and the data read out from the FIFO. In order to balance between the data written into FIFO and the data read from FIFO, the PD sends the phase difference into the LPF for low pass filtering so as to produce a corresponding signal. This signal is sent to the VCO as the control signal for adjusting ODU1 clock frequency output from the VCO, so as to control the ODU1 clock output from VCO to keep track of the gapped clock, thereby balancing the ODU1 clock with the gapped clock.

Since there are not only fixed bits of padding data but also asynchronous data rate adjusting and controlling bits, as well as a great deal of overhead, in STM-N, it is difficult to suppress jittering in an actually output ODU clock by only utilizing one PLL to adjust ODU1 clock directly, and thus it is difficult to meet the requirement for OTN jittering in G.8251.

SUMMARY OF THE INVENTION

The embodiments of the present invention are to provide a method and a circuit for obtaining asynchronous demapping clock, by which a low-jittering and high-performance demapping clock signal may be obtained, thereby ensuring a high-performance data demapping.

The embodiments of the present invention provide the following technical solutions:

An embodiment of the present invention provides a method of obtaining asynchronous demapping clock, including:
  obtaining a smoothed clock with even gaps in accordance with data to be demapped and a corresponding clock signal;
  performing phase locking the smoothed clock with even gaps in accordance with a signal reflecting writing and reading conditions of data of a First In First Out (FIFO), to obtain a clock signal required for demapping.

The step of obtaining a smoothed clock with even gaps may include:
  smoothing the corresponding clock signal with a predefined scheduling pattern, and obtaining the smoothed clock with even gaps.

Wherein the scheduling pattern may be obtained through calculation in accordance with the data to be demapped.

The step of performing phase locking may include:
  writing the data to be demapped into the FIFO based on the smoothed clock;
  performing phase locking in accordance with positions of reading and writing pointers of the FIFO to obtain the required Optical Channel Data Unit (ODU) clock signal.

Alternatively, the step of performing phase locking may include:
  performing phase discrimination, low pass filtering, and voltage-controlled oscillation for the smoothed clock, and obtaining the required Optical Channel Data Unit (ODU) clock signal.

An embodiment of the present invention provides a circuit for generating an asynchronous demapping clock, which includes:
  a smoothing control module, which is adapted to receive data to be demapped and a corresponding clock signal, and obtain and output a smoothed clock with even gaps in accordance with the data to be mapped and the corresponding clock signal;
  a phase locking module, which is adapted to perform phase locking the smoothed clock with even gaps input from the smoothing control module in accordance with a signal reflecting writing and reading conditions of data of a FIFO so as to obtain the demapping clock.

In this circuit, the phase locking module may include a phase discriminator, a low-pass filter, and a voltage controlled oscillator, the signal reflecting writing and reading conditions of data of the FIFO is processed by the phase discriminator, the low-pass filter, and the voltage controlled oscillator in turn so as to obtain the asynchronous demapping clock.

Alternatively, the phase locking module may include a phase discriminator, a low-pass filter, a reverse control sub-module, a Digital/Analogue (D/A) conversion sub-module, and a voltage controlled oscillator, the signal reflecting writing and reading conditions of data of the FIFO is processed by the phase discriminator, the low-pass filter, the reverse control sub-module, the D/A conversion sub-module, and the voltage controlled oscillator in turn so as to obtain the asynchronous demapping clock.

Alternatively, the phase locking module may include a phase discriminator, a low-pass filter, a reverse control sub-module, and a direct digital synthesis module; the signal reflecting writing and reading conditions of data of the FIFO is processed by the phase discriminator, the low-pass filter, the reverse control sub-module, and the direct digital synthesis module in turn so as to obtain the asynchronous demapping clock.

An embodiment of the present invention provides an asynchronous demapping circuit, which, in addition to the above described circuit for generating an asynchronous demapping clock, further includes:
- a writing control module, which is adapted to receive data to be demapped and a corresponding clock signals, and output a gapped clock as the writing clock of a primary FIFO;
- a primary FIFO, which is adapted to receive the data to be demapped which are written into the FIFO in accordance with the gapped clock output from the writing control module and control the reading of data from the primary FIFO by utilizing the smoothed clock output from the smoothing control module as a reading clock;
- a secondary FIFO, which is adapted to receive the data output from the primary FIFO, in which the smoothed clock output from the smoothing control module is utilized as a writing clock, the secondary FIFO is connected to the phase locking module, and is adapted to send positions of writing and reading pointers of the secondary FIFO to the phase locking module, so as to enable the phase locking module to perform phase locking in accordance with the positions of writing and reading pointers, to obtain a reading clock for the secondary FIFO and control the reading of demapped data from the secondary FIFO.

An embodiment of the present invention provides an asynchronous demapping circuit, which, in addition to the above described circuit for generating an asynchronous demapping clock, further includes:
- a writing control module, which is adapted to receive the data to be demapped and a corresponding clock signal, and output a gapped clock as a writing clock for a FIFO;
- the FIFO, which is adapted to receive the data to be demapped which are written into the FIFO in accordance with the gapped clock from the writing control module and control the reading of demapped data from the FIFO by utilizing the demapping clock output from the phase locking module as a reading clock.

As can be seen from the above description, with the method of the present invention, a low-jittering ODU clock signal may be recovered from the SDH, thereby a high-performance demapped ODU data may be obtained from the asynchronous demapping process in OTN.

The method for clock generation provided in the embodiments of the present invention is applicable to a variety of asynchronous demapping processes in OTN and can obtain high-performance clock signals.

In summary, the method according to the embodiments of the present invention can effectively filter off the jittering created during asynchronous mapping/demapping processes and thus ensure a high-performance clock output. Furthermore, the method is applicable to not only mapping from OTN to SDH but also other asynchronous demapping processes, e.g., mapping from SDH to OTN.

DETAILED DESCRIPTION OF THE EMBODIMENTS

The following description takes ODU1 data as an example since the demapping procedures for various ODU data are similar.

The embodiments of the present invention are directed to smooth a clock signal in accordance with the characteristics of the data to be processed so as to obtain a smooth clock signal; then, a phase. locking is performed in accordance with a signal that reflects the writing and reading conditions of data of an FIFO, in order to obtain a low-jittering clock signal.

In particular, a method of obtaining asynchronous demapping clock according to an embodiment of the present invention includes:

First, the data to be demapped and the corresponding clock signal are processed to obtain a smoothed clock with even gaps;

Specifically, a predefined scheduling pattern may be utilized to smooth the corresponding clock signal to obtain a smoothed clock with even gaps. The scheduling pattern is obtained through calculation in accordance with the characteristics of the data to be demapped;

Next, a phase locking is performed in accordance with a signal that reflects the writing and reading conditions of data of the FIFO, to obtain the clock signal required for demapping. Particularly, the phase locking can be implemented by using either of the following two approaches:

(1) The data to be demapped is written into the FIFO based on the smoothed clock, and then a phase locking is performed in accordance with the positions of the writing and reading pointers of the FIFO to obtain the required ODU (Optical channel Data Unit) clock signal;

(2) A phase locking is performed for the smoothed clock to obtain the required ODU clock signal.

Other embodiments of the present invention will be detailed below.

Figure 3:
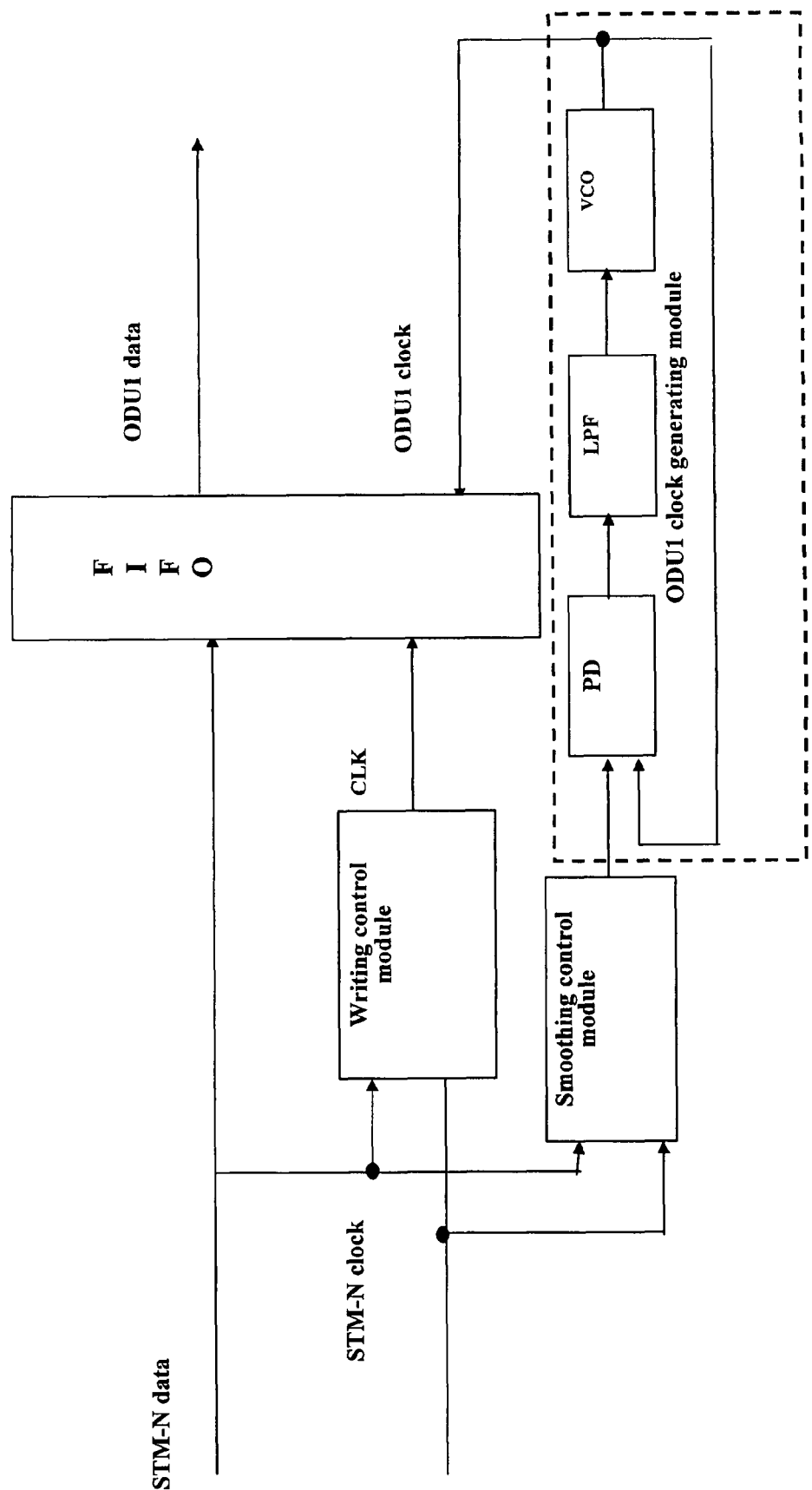
FIG. 3 is a schematic diagram of a first asynchronous demapping circuit according to an embodiment of the present invention.

In an embodiment, a circuit for obtaining an asynchronous demapping clock includes:
a smoothing control module, which receives the data to be demapped and the corresponding clock signal, and is adapted to obtain and output a smoothed clock with even gaps in accordance with the data to be demapped and the corresponding clock signal;

a phase locking module, which is connected to the output of the smoothing control module, and is adapted to perform a phase locking for the smoothed clock to obtain the demapping clock. Particularly, the phase locking processing includes phase discrimination and low pass filtering, etc.;

An asynchronous demapping circuit for the data to be demapped based on the above described circuit for obtaining an asynchronous demapping clock is shown in FIG. 3. The asynchronous demapping circuit includes a writing control module, a smoothing control module, a phase locking module, and an FIFO, wherein:

The writing control module is adapted to receive the data to be demapped and the corresponding clock signal, and output a gapped clock to the FIFO as the writing clock of the FIFO.

The smoothing control module is adapted to smooth the corresponding clock signal of the data to be demapped to obtain a smoothed clock with even gaps and send the smoothed clock to the phase locking module.

The phase locking module, i.e., the ODU1 clock generating module as shown in FIG. 3, includes a phase discriminator (PD), a low-pass filter (LPF), and a voltage controlled oscillator (VCO). The phase locking module is adapted to perform a phase locking for the smoothed clock and obtain an asynchronous demapping clock.

The FIFO is adapted to receive the data to be demapped which are written into the FIFO in accordance with the gapped clock CLK output from the writing control module. The FIFO also utilizes the demapping clock, i.e., ODU1 clock, output from the phase locking module as the reading clock to control the reading of the demapped data output from the FIFO.

Figure 5:
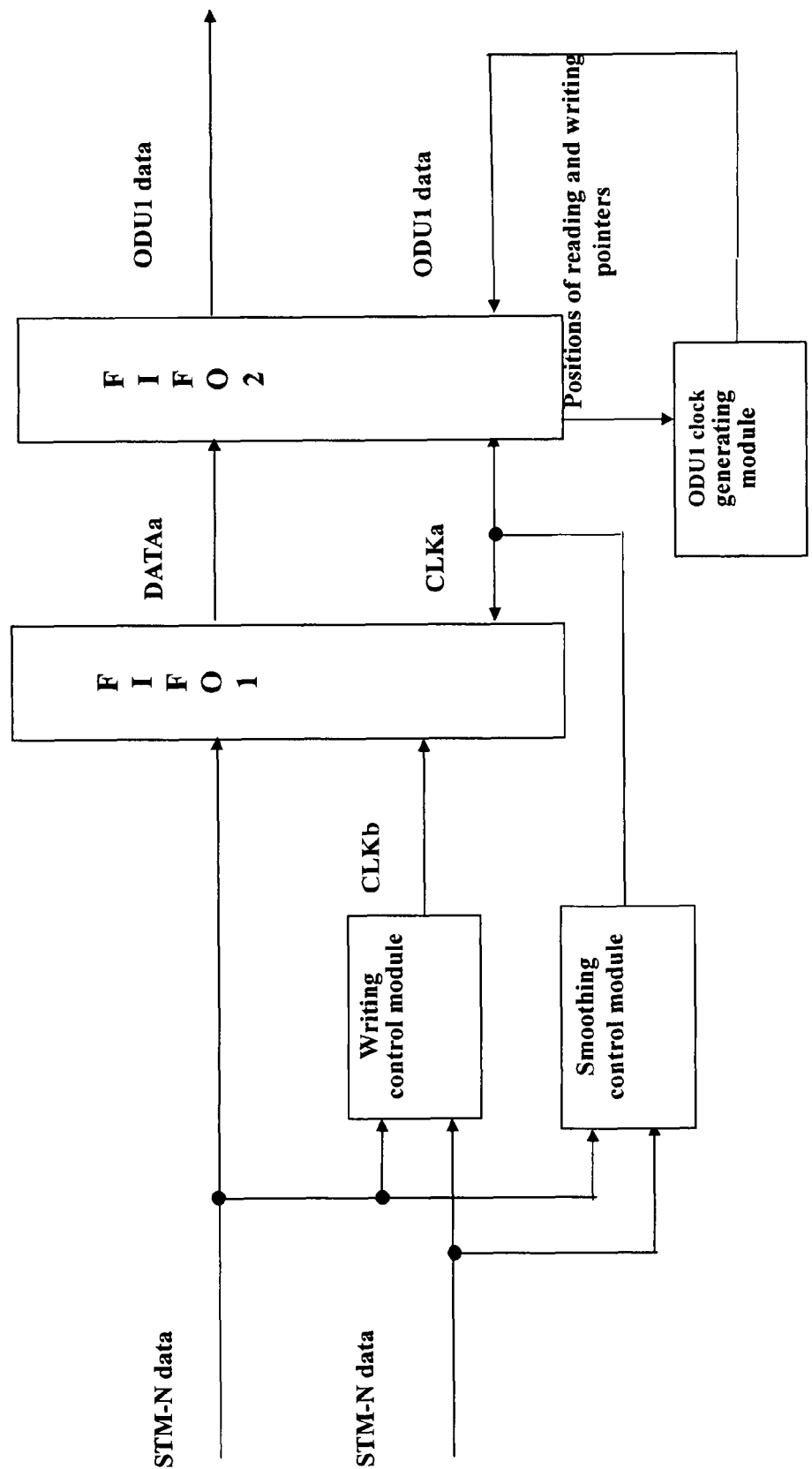
FIG. 5 is a schematic diagram of a second asynchronous demapping circuit according to an embodiment of the present invention.

In addition, the embodiments of the present invention also provide another asynchronous demapping circuit based on the above described circuit for obtaining an asynchronous demapping clock, as shown in FIG. 5. This asynchronous demapping circuit includes: a writing control module, a smoothing control module, a primary FIFO1, a secondary FIFO2, and an ODU1 clock generating module (i.e., a phase locking module). The connection relationship between the modules and the functions of the modules will be described in detail below:

(1) The Writing Control Module

Figure 4:
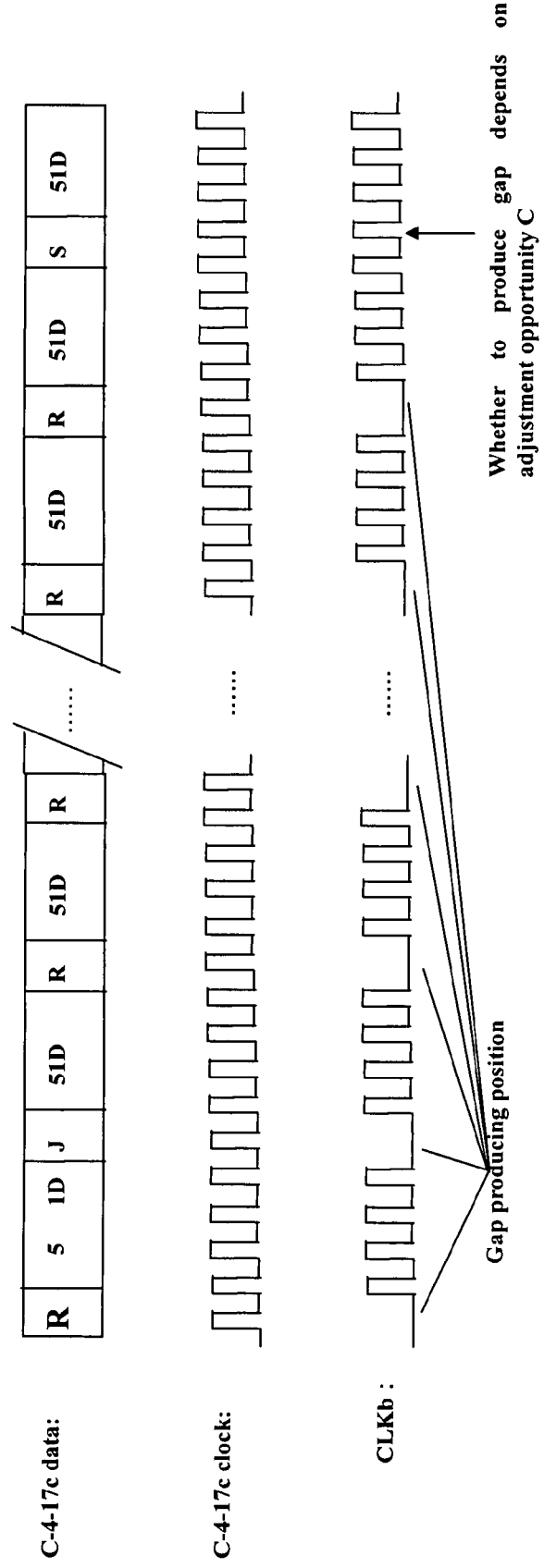
FIG. 4 is a schematic diagram illustrating the principle for generating clock by a writing control module.

The writing control module is adapted to generate a gapped clock CLKb in accordance with an STM-N clock and the actual data (i.e., the STM-N data as shown in FIG. 5) through the following procedures: first, the overhead in STM-N data is stripped off, that is, a gap is generated in the clock at the position of overhead, so as to produce a C-4-17c clock. Next, a gap is generated in the clock at the position of the padding bits on the basis of the C-4-17c clock, that is, the padding bits in C-4-17c are removed, so as to produce a clock CLKb, as shown in FIG. 4; then, the actual data is written into the primary FIFO 1 under the control of the clock CLKb.

(2) The Smoothing Control Module

Figure 1:
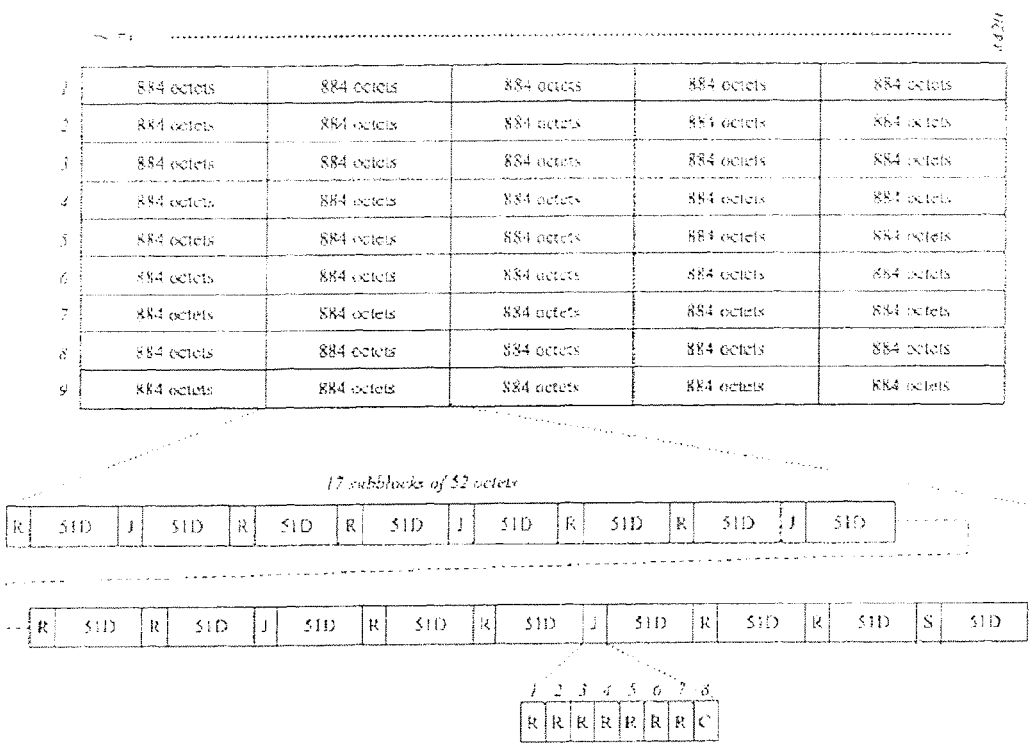
FIG. 1 is a structural representation of the mapping from ODU1 to C-4-17c.
Figure 2:
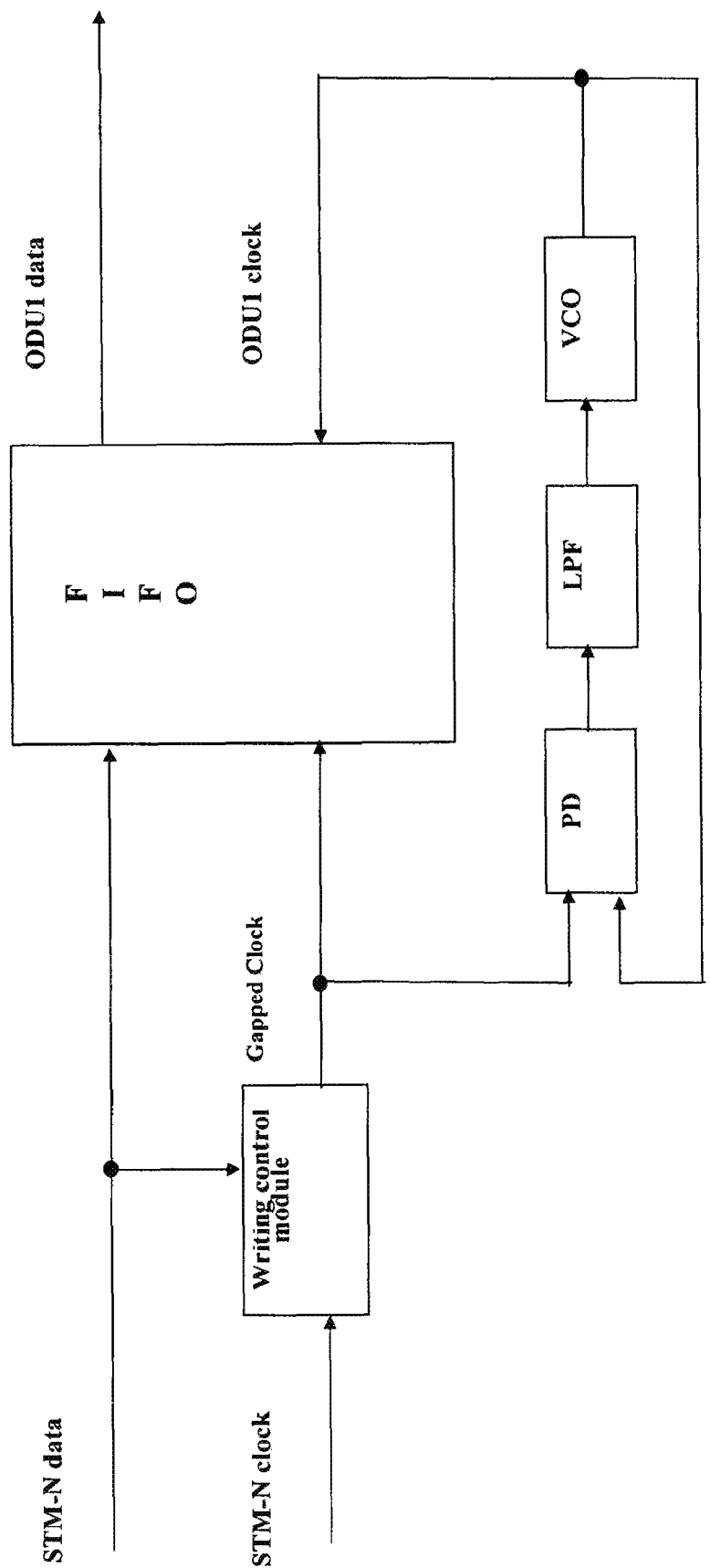
FIG. 2 is a schematic diagram of an asynchronous demapping circuit in the prior art.

The smoothing control module is adapted to produce a gapped clock CLKa in accordance with the STM-N clock and the actual data to control the rate for reading data from the primary FIFO 1; the clock CLKa is a clock signal with evenly distributed gaps, i.e., a smoothed clock;

Depending on the actual structure for mapping ODU1 to C-4-17c, the clock CLKa may be a gapped clock of 155 MHz, then the data DATAa output from the primary FIFO 1 have a 17-bit width. The CLKa may also be a clock of any other frequency. For the frequency of 155 MHz, a 6.4 ns jittering will occur whenever a clock gap is produced. Therefore, the higher the clock frequency is, the smaller the clock jittering per gap will be;

The smoothing control module may utilize a predefined scheduling pattern to achieve an even distribution of clock gaps. The calculation method for the corresponding scheduling pattern in the case of a 17-bit data width and a 155 MHz clock frequency will be described below:

As shown in FIG. 1, a frame includes 9 subframes, each of the subframes includes 5 blocks, each block is used as a scheduling cycle, therefore:

1 scheduling cycle=(270×8)/5=432 cycles of 155 M;

The payloads to be read in 1 scheduling cycle=17×51D or 17×51D+1D bytes;

Thus, without the "S" byte, the number of payloads (17 bits) to be read in 1 scheduling cycle=(17×51D)/17=408. That is, for a block with 17×51D payloads with the "S" byte omitted, a scheduling pattern 408 can be used. In that way, the writing into primary FIFO1 and the reading from FIFO1 may be balanced;

Taking the "S" byte into account, for blocks in which the "S" byte is valid, a scheduling pattern 409 may be used. In that case, the writing into FIFO1 and the reading from FIFO1 may be balanced, as long as there are 17 blocks in which the "S" bytes are valid, in which 8 blocks employ the scheduling pattern 409 and the other 9 blocks employ the scheduling pattern 408;

Therefore, by choosing between the two scheduling patterns <432, 408> and <432, 409>, the CLKa may smooth the clock gaps. <432, 308> indicates that 408 cycles of 432 cycles are valid, in other words, there are 432−408=24 clock gaps.

The distribution of gaps in <432, 408> and <432, 409> patterns can be determined based on the principle of even gap distribution. For example, in the case of <432, 408> pattern, there are 408 valid cycles in 432 cycles of 155M and altogether 24 gaps. If the gaps are distributed evenly, i.e., 432/24=18, the scheduling pattern can be designed as 24 consecutive cycles of <18, 17>. For each <18, 17> cycle, the gap can be in the 9th cycle. In the case of <432, 409> pattern, the pattern can be designed as 12 cycles of <18, 17>, then 1 cycle of <18, 18>, and consequently 11 cycles of <18, 17>, with 23 gaps altogether.

Thus, a smoothed clock with even gaps may be obtained by use of the smoothing control module.

(3) The Odu1 Clock Generating Module (i.e., The Phase Locking Module)

Figure 6:
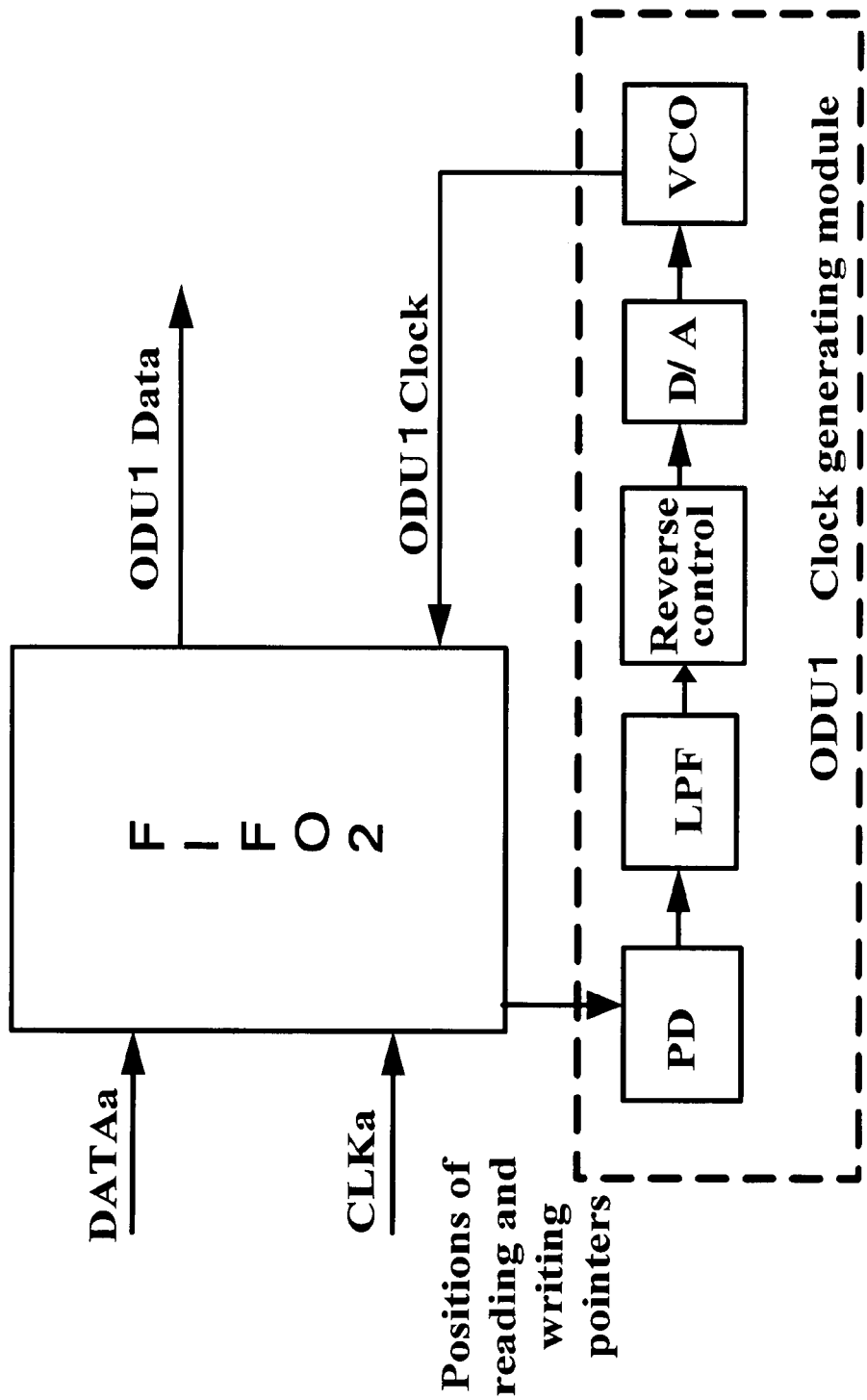
FIG. 6 is a schematic diagram illustrating the principle of the ODU clock generating module as shown in FIG. 5.

As shown in FIG. 6, the ODU1 clock generating module mainly includes a phase discriminator (PD), a low-pass filter (LPF), a reverse control sub-module, D/A (Digital to Analog) conversion sub-module, and a VCO. The PD reads the positions of writing and reading pointers of the secondary FIFO2 to obtain the difference in pointer positions. The difference in pointer positions is the actual remaining amount of data, which is referred to as A. The remaining amount of data A reflects the difference between current data input into FIFO2 and the current data output from FIFO2, i.e., the phase difference between clock CLKa and ODU1 clock. The LPF sub-module performs a digital low-pass filtering for each obtained A (A1, A2, A3, ... ), and sends the filtered result B to the reverse control sub-module;

Firstly, the reverse control sub-module sends a mean value to the D/A conversion sub-module to control the output from the VCO. Next, the reverse control sub-module compares each obtained B (B1, B2, B3, ... ). If the value of B is increasing, it means that the frequency of ODU1 clock output from the VCO is lower than that of CLKa. Thus, the data sent to the D/A conversion sub-module needs to be increased, so as to increase the frequency of ODU1 clock output from the VCO. Otherwise, the data sent to the D/A conversion sub-module needs to be decreased, so as to decrease the frequency of ODU1 clock output from the VCO. The above procedure may be repeated so as to balance the ODU1 clock output from VCO with the CLKa.

Figure 7:
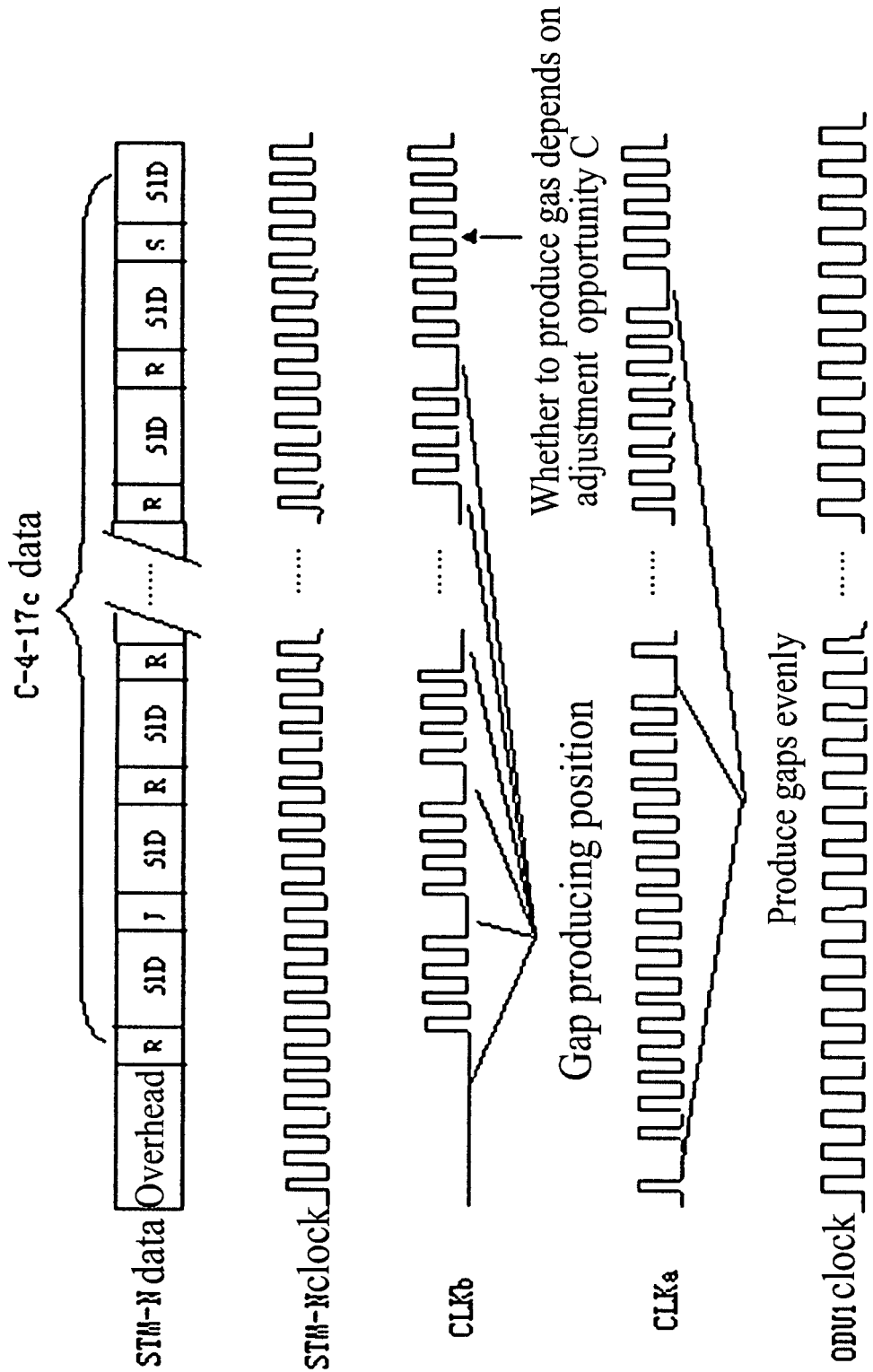
FIG. 7 is a schematic diagram of the clock signals as shown in FIG. 5.

The time relationships between the clock signals CLKb, CLKa, and ODU1 obtained through the method according to the embodiments of the invention are shown in FIG. 7. In FIG. 7, the characteristics of the clock signals are also illustrated. In addition, it can be seen that, with the method according to the embodiments of the invention, a desired clock signal with low-jittering and high-performance may be produced.

In addition, in the embodiments of the present invention, a Direct Digital Synthesis (DDS) module may be used instead of the D/A conversion sub-module and VCO sub-module, to produce the ODUL clock of corresponding frequency in accordance with the data input.

In conclusion, with the method according to the embodiments of the present invention, jittering created during asynchronous mapping/demapping process may be filtered off effectively, and a high-performance clock output may be guaranteed. Furthermore, the method according to the embodiments of the present invention is applicable to not only mapping from OTN to SDH but also other asynchronous demapping processes, for example, mapping from SDH to OTN, thereby improving the data demapping performance effectively.

While the present invention has been described with respect to the embodiments described above, it is to be understood that the protection scope of the present invention should not be limited to those specific embodiments. Those skilled in the art can easily make variations or replacements to the embodiments, without departing from the technical scope disclosed in the present invention. Any of such variations or replacements shall fall into the protection scope of the present invention. Therefore, the protection scope of the present invention shall be defined by the following claims.

What is claimed is:

1. An asynchronous demapping circuit, wherein the asynchronous demapping circuit comprises:
    a smoothing control module, which is adapted to receive data to be demapped and a corresponding clock signal, and obtain and output a smoothed clock with evenly distributed gaps in accordance with the data to be demapped and the corresponding clock signal, wherein a gap of the smoothed clock is obtained from removing overhead bits and padding bits from a corresponding Synchronous Transport Module Level-N frame;
    a phase locking module, which is adapted to perform phase locking to the smoothed clock with evenly distributed gaps input from the smoothing control module in accordance with a signal reflecting writing and reading conditions of data of a secondary First In First Out (FIFO) so as to obtain a demapping clock;
    a writing control module, which is adapted to receive data to be demapped and corresponding clock signal, and output a gapped clock as a writing clock of a primary FIFO;
    the primary FIFO, which is adapted to receive the data to be demapped which are written into the primary FIFO in accordance with the gapped clock output from the writing control module and control reading of data from the primary FIFO by utilizing the smoothed clock output from the smoothing control module as a reading clock;
    the secondary FIFO, which is adapted to receive the data output from the primary FIFO, wherein the smoothed clock output from the smoothing control module is utilized as a writing clock of the secondary FIFO, the secondary FIFO is connected to the phase locking module, and is adapted to send positions of writing and reading pointers of the secondary FIFO to the phase locking module, so as to enable the phase locking module to perform phase locking in accordance with the positions of writing and reading pointers, to obtain a reading clock for the secondary FIFO to control the reading of demapped data from the secondary FIFO.

2. The asynchronous demapping circuit according to claim 1, wherein the phase locking module comprises a phase discriminator, a low-pass filter, and a voltage controlled oscillator, the signal reflecting writing and reading conditions of data of the secondary FIFO is processed by the phase discriminator, the low-pass filter, and the voltage controlled oscillator in turn so as to obtain an asynchronous demapping clock.

3. The asynchronous demapping circuit according to claim 1, wherein the phase locking module comprises a phase discriminator, a low-pass filter, a reverse control sub-module, a Digital/Analogue (D/A) conversion sub-module, and a voltage controlled oscillator, the signal reflecting writing and reading conditions of data of the secondary FIFO is processed by the phase discriminator, the low-pass filter, the reverse control sub-module, the D/A conversion sub-module, and the voltage controlled oscillator in turn so as to obtain an asynchronous demapping clock.

4. The asynchronous demapping circuit according to claim 1, wherein the phase locking module comprises a phase discriminator, a low-pass filter, a reverse control sub-module, and a direct digital synthesis module; the signal reflecting writing and reading conditions of data of the secondary FIFO is processed by the phase discriminator, the low-pass filter, the reverse control sub-module, and the direct digital synthesis module in turn so as to obtain an asynchronous demapping clock.

* * * * *